United States Patent [19]

Leiber et al.

[11] E Re. 31,383

[45] Reissued Sep. 13, 1983

[54] ANTILOCKING CONTROL SYSTEM

[75] Inventors: Heinz Leiber, Leimen; Jürgen Gerstenmeier, Ngm.-Waldhilsbach; Wolfgang Korasiak, Ketsch, all of Fed. Rep. of Germany

[73] Assignee: Teldix GmbH, Heidelberg, Fed. Rep. of Germany

[21] Appl. No.: 127,261

[22] Filed: Mar. 4, 1980

Related U.S. Patent Documents

Reissue of:

[64] Patent No.: 4,077,675
Issued: Mar. 7, 1978
Appl. No.: 747,685
Filed: Dec. 6, 1976

[30] Foreign Application Priority Data

Dec. 6, 1975 [DE] Fed. Rep. of Germany ..... 2555005

[51] Int. Cl.[3] ..... B60T 8/02

[52] U.S. Cl. ..... 364/426; 303/95; 303/106; 303/110

[58] Field of Search ..... 364/426; 303/95, 100, 303/103, 104, 106, 109, 110, 111

[56] References Cited

U.S. PATENT DOCUMENTS

| | | | |
|---|---|---|---|
| 3,131,975 | 5/1964 | Smith et al. | 303/104 |
| 3,652,135 | 3/1972 | Baumann | 303/95 |
| 3,866,979 | 2/1975 | Rabus et al. | 303/106 |

FOREIGN PATENT DOCUMENTS

| | | |
|---|---|---|
| 2342358 | 2/1975 | Fed. Rep. of Germany . |
| 2437432 | 2/1975 | Fed. Rep. of Germany . |
| 1364476 | 8/1974 | United Kingdom . |
| 1383042 | 2/1975 | United Kingdom . |
| 1383043 | 2/1975 | United Kingdom . |
| 1387119 | 3/1975 | United Kingdom . |
| 1387120 | 3/1975 | United Kingdom . |
| 1392598 | 4/1975 | United Kingdom . |

*Primary Examiner*—Jerry Smith
*Attorney, Agent, or Firm*—Spencer & Kaye

[57] ABSTRACT

In an antilocking control system in which wheel speed is monitored to control a braking operation in a manner to prevent locking of the braked wheels, a tendency of the wheel velocity to decrease more rapidly than a reference rate acts to reduce the brake pressure, and a subsequent tendency of the wheel velocity to increase acts to either hold constant or to gradually increase the brake pressure.

27 Claims, 8 Drawing Figures

ANTILOCKING CONTROL SYSTEM

Matter enclosed in heavy brackets [ ] appears in the original patent but forms no part of this reissue specification; matter printed in italics indicates the additions made by reissue.

BACKGROUND OF THE INVENTION

The present invention relates to an antilocking control system of the type including at least one sensor to measure the speed of a vehicle wheel, an evaluation circuit which receives the signals from the sensor and processes them into control signals, and a brake pressure control device which responds to the control signals to effect a variation in the brake pressure, and in which the occurrence of wheel slip of a certain magnitude and/or a wheel deceleration of a certain magnitude initiates a reduction in pressure.

Known antilocking control systems regulate the brake pressure by means of slip signals and/or deceleration and acceleration signals. Threshold values are provided for all three parameters and the above-mentioned signals are generated only if these thresholds are exceeded by the slip, the acceleration and/or the deceleration. The devices required by these systems for measuring acceleration, deceleration and their thresholds have proven to be difficult to design in the digital signal processing art.

SUMMARY OF THE INVENTION

It is therefore an object of the present invention to provide an antilocking control system which is simple to produce, even as a digital arrangement, but can effectively respond even in the presence of extreme wheel velocity variations.

This and other objects are accomplished according to the invention by a system which is based on an antilocking control system of the above-described type and which includes signal deriving means in the evaluation circuit and composed of wheel speed variation monitoring means, which continuously determine the tendency exhibited by the wheel speed during a period of decreasing wheel velocity and/or during a period of increasing wheel velocity, based on a comparison between two successive values of a parameter which depends on the wheel speed at successive points in time, and signal processing means which, when a "wheel velocity decrease" tendency is noted, generate a control signal to reduce brake pressure and when a "wheel velocity increase" tendency is noted, generate a signal to keep the brake pressure constant or slowly raise the pressure.

According to the present invention, the tendency of the wheel speed is determined and utilized for the pressure regulation. By "tendency" is meant simply variation of the wheel speed in one direction or the other.

This tendency can be measured in various ways. For example, the wheel slip can be measured and the slip values at successive points in time can be compared. Instead of measuring the slip, the wheel speed at successive points in time can be compared. The successive points in time in both cases may have a given spacing or may be those instants between which a certain difference has developed between the values to be compared. In both cases, the value present at the first point in time with which a comparison is to be made later is stored until such comparison.

According to a special embodiment of the invention, a circuit is provided for obtaining a filtered wheel velocity value in which the momentary wheel velocity value is compared with a stored wheel velocity value, and a signal for correction of the stored value by a small given amount is generated when the two values differ from one another by a given amount. In a digital system, this small correction value is, for example, the smallest possible digital change in the stored value. The signal generated for correction can then be utilized to form the tendency signal.

The described arrangement for producing the filtered value may be provided for forming the tendency signal alone, but can also be utilized, for example, as the momentary wheel velocity signal in case of slip signal generation.

From the above-mentioned signals, which are generated to correct the stored value, tendency signals can be derived in that they are used to start a timer which then emits an output signal for a given length of time. In a similar manner tendency signals can be generated from the signals obtained from the above-mentioned comparisons.

The method of the present invention for measuring the wheel speed tendency can be adapted for use only for decreasing wheel speed, or for use only for increasing wheel speed, or for both directions of change in speed.

It should also be noted that the time interval between the end of a signal indicating a speed increase tendency and the beginning of a signal indicating a speed decrease tendency can be determined. This interval is short if a reversal of the wheel velocity has already taken place during the unstable range and braking took place on a surface having a low coefficient of friction with the tire. Thus it is possible to deduce from this time measurement that the pressure reduction phase could advantageously be extended. For example, if during the measurement of the signal interval a certain length of time has not been reached, the pressure holding phase at the end of the pressure reduction phase can be eliminated in part and pressure can continue to be reduced until an acceleration signal appears, or at least for a given period of time.

DESCRIPTION OF THE PREFERRED EMBODIMENTS

Figure 1:
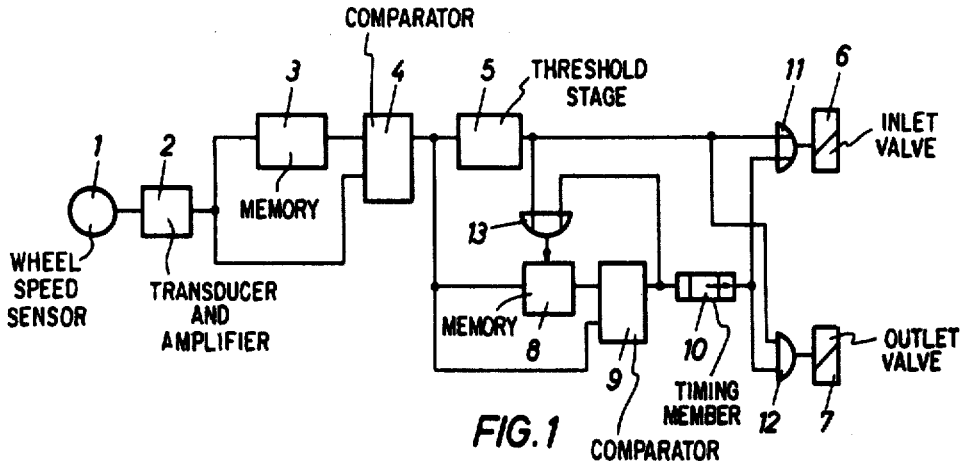
FIG. 1 is a schematic block diagram of a first embodiment of a control system according to the invention.

FIG. 1 shows a wheel speed sensor 1 which emits a signal dependent on the speed of the wheel, and an amplifier and transducer 2 connected to sensor 1 to produce a signal proportional to the wheel speed. A memory 3 is connected to the output of unit 2 to form a signal representation which approximates the curve of the vehicle speed with respect to time and which follows increases in the input signal quickly but follows decreases in the signal slowly. This memory 3 may have switchable discharge time constants, which can be provided by constructing the memory according to well-known techniques, but this is not directly pertinent to the contribution of the present invention. The signal representation, or reference value, stored in memory 3 is compared in a [computer] *comparator* 4 with the current instantaneous value of the wheel velocity signal from unit 2. Comparator 4 emits a primary control signal proportional to the measured wheel slip. If this slip signal exceeds a threshold value, indicated by a threshold stage 5 connected to comparator 4, an actuating signal is generated for an electrically controlled, normally open inlet valve 6 and a processed control signal is gated for an electrically controlled, normally closed outlet valve 7.

A further memory 8 receives the output signal from comparator 4 and provides an output representing the slip value existing a short time before. This stored slip value is compared with the current momentary slip value from comparator 4 in a comparator 9 having a selected response threshold. An output signal is produced by comparator 9 when the current value exceeds the stored value by a given amount, corresponding to the comparator threshold, i.e. when the slip has increased by a certain amount. The signal then produced causes the current momentary value to be newly stored in memory 8 and actuates a timing member 10 which then emits an output signal for a given period of time. This output signal serves as an actuating signal for inlet valve 6, the outputs of stage 5 and timing member 10 being connected to the signal input of valve 6 via an OR gate 11. Elements 8 and 9 thus constitute one embodiment of wheel speed variation monitoring means. Moreover, this signal from member 10, together with the control signal from threshold stage 5 causes the outlet valve 7 to be actuated via an AND gate 12. Storage of a new wheel slip value in memory 8 is controlled by the output of an OR gate 13 having inputs connected to stage 5 and comparator 9.

Figure 2:
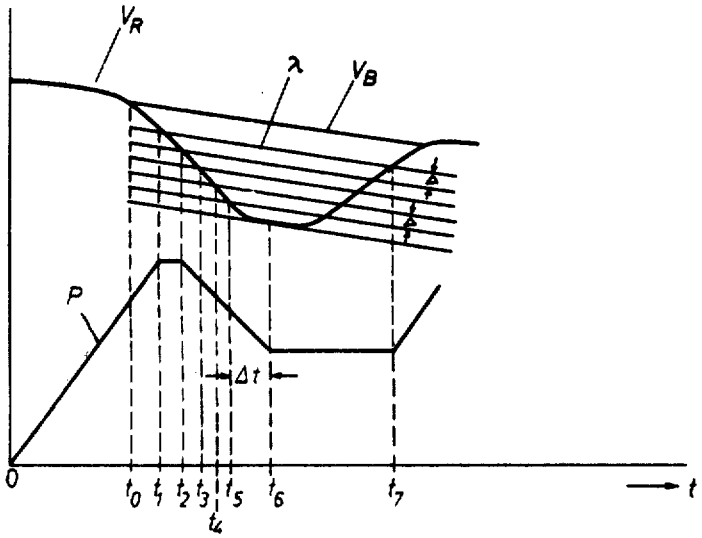
FIG. 2 is a signal diagram illustrating the operation of the system of FIG. 1.

The operation of the circuit of FIG. 1 will be described with reference to the signal vs. time diagram of FIG. 2 in which $V_R$ is the current, instantaneous wheel velocity and the output signal from amplifier 2, $V_B$ the velocity corresponding to a reference signal and the output signal from memory 3, P the resulting brake pressure at the wheel, and $\lambda$ is the wheel velocity value which differs from $V_B$ by an amount corresponding to the threshold level of stage 5.

Beginning with $t=0$ braking begins, the brake pressure P increases and the wheel begins to decelerate more rapidly than the vehicle. Beginning with time $t_0$, memory 3 is no longer able to follow the wheel velocity and its output signal $V_B$ decreases more slowly than the wheel velocity. At time $t_1$ threshold of stage 5 is passed and thus the slip signal is conducted from comparator 4 to inlet value 6 to close the valve so that pressure P is thereafter kept constant. At the same time a signal is applied to memory 8 via an OR gate 13 to cause the current slip value to be stored in the memory.

At time $t_2$ the current slip value, appearing at the output of comparator 4, deviates from the value stored in memory 8 by the amount represented by the threshold of comparator 9 and an output signal is generated by comparator 9 which causes new storage of the current slip value in memory 8 and actuates time member 10 to thus open outlet valve 7. Since, consequently, new setting signals are generated at the output of comparator 9 before the end of the time constant $\Delta$ T of time member 10, i.e. at $t_3$, $t_4$ and $t_5$, and this whenever the difference between slip values is again the same ($\Delta$), pressure continues being reduced until $t_6$. $\Delta$ is the threshold of comparator 9. $\Delta$ is given by $\Delta = S_{t2} - S_{t1} = S_{t3} - S_{t2} = S_{t4} - S_{t3}$ when $S_{tn}$ is the difference of the velocities at the times $t_n$ and $t_0$.

At $t_6$ the pressure reduction phase changes to a pressure holding phase, since comparator 9 produces no output signal after $t_5$ and the interval between $t_5$ and $t_6$ equal $\Delta$ T. Thus at a time $\Delta$ T after $t_5$, the control signal for outlet valve 7 ends and thus the pressure reduction phase ends. The constant pressure phase is maintained by the continuous slip signal at the output of threshold stage 5. It continues until at $t_7$ threshold $\lambda$ of member 5 is passed again, i.e. the undue slip has disappeared.

Figure 3:
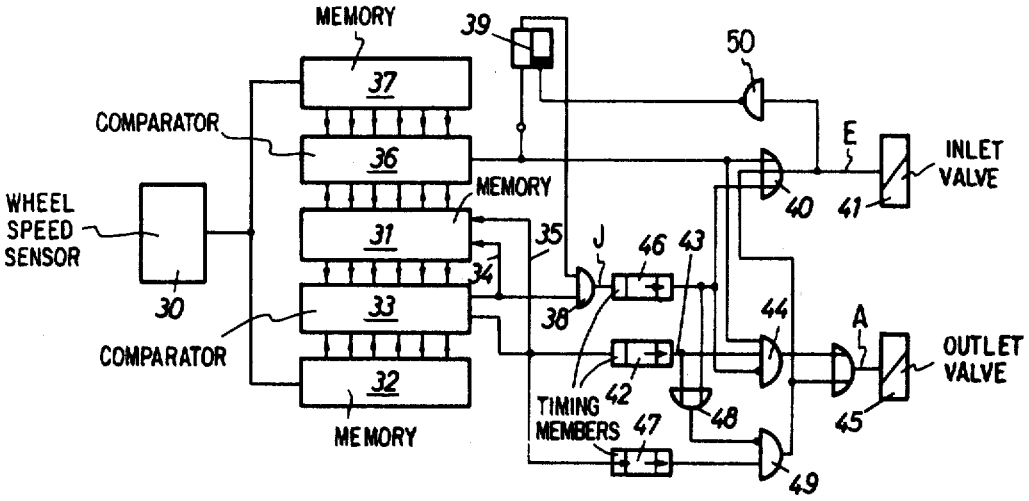
FIG. 3 is a block circuit diagram of another embodiment of a system according to the invention.

In the embodiment shown in FIG. 3, digital circuitry is employed. A wheel speed sensor 30 feeds a digital representation of the current, instantaneous value of the wheel velocity to two digital memories 32 and 37 and the value in memory 32 is compared in a comparator 33 with the value contained in a memory 31. Memories 32 and 37 may be constituted by registers. Depending on the algebraic sign of the difference between the value stored in memory 31 and the instantaneous value in register 32 a short pulse is sent on one of lines 34 or 35 to memory 31, which is designed as a counter, for example, to vary its contents up or down by one bit value in a direction to reduce the difference. This operation produces a filtered memory value since rapid changes are followed slowly and short duration changes are taken into account only slightly.

The value contained in memory 31 may serve as the momentary value for generation of the slip signal by a comparator 36. Comparator 36 compares the digital value in memory 31, as the momentary value, with a reference value stored in memory 37, which is obtained in that memory 37 follows increases in the input value from sensor 30 rapidly but follows decreases slowly. A memory corresponding to the memory 37 and its function are known from U.S. Pat. No. 3,922,534, FIG. 1.

The slip signal, which appears when there is a certain deviation $\lambda$ between the "momentary value" and the reference value, is applied, via an OR gate 40, to close inlet valve 41. If it is assumed that a timing member 42 and control line 43 were not present, the slip signal would also open the outlet valve 45 via an enabled AND gate 44. This causes the brake pressure to drop.

Figure 4:
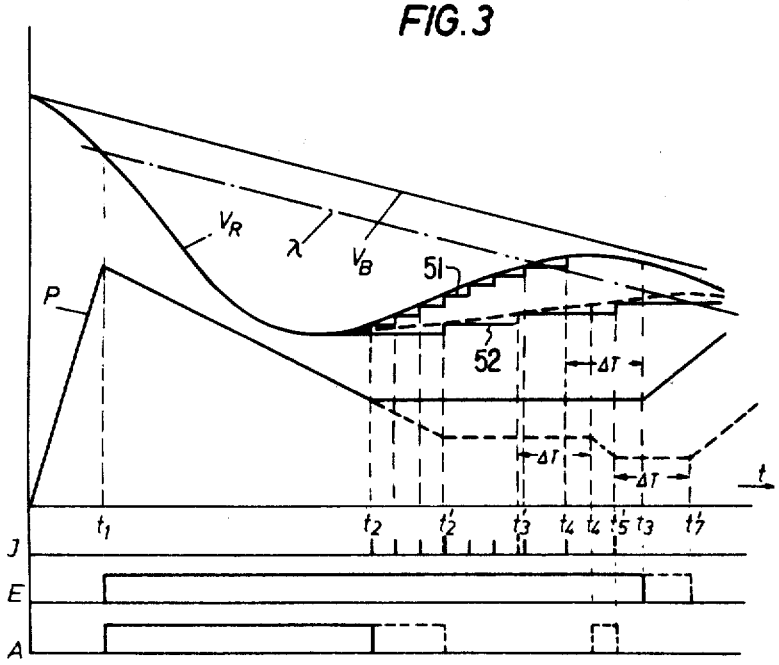
FIG. 4 is a signal diagram illustrating the operation of the system of FIG. 3.

FIG. 4 depicts the behavior of the reference value $V_B$, the wheel speed $V_R$, the slip value $\lambda$ and the brake pressure P as well as the signals J reaching the time member 46, the control signals E for the inlet valve 41, and the control signals A for the outlet valve 45, respectively, with respect to time. The above-mentioned pressure reduction phase begins at $t_1$ and ends at $t_2$.

At $t_2$ a first output pulse appears on line 34 due to the fact that the current, instantaneous valuve of the wheel velocity in memory 32 exceeds the filtered value currently stored in memory 31 by the given unitary increment.

The pulse on line 34 travels, via an AND gate 38 which is enabled by an output signal produced by a bistable member 39 during continuous regulation, to a timing member 46 when then generates an output pulse that blocks AND gate 44. Thus the pressure is kept constant in the assumed case which is shown in FIG. 4 by solid lines and the stepped curve 51 representing the state of memory 31, until time $t_3$. This constant pressure phase is effected because the timing member is repeatedly actuated by the solid-line pulses J each time before the end of its pulse period $\Delta$ T and because the last pulse at $t_4$, when the wheel velocity has again exceeded threshold $\lambda$, is followed by a pulse of duration $\Delta$ T from timing member 46. At $t_3$, the output signal E disappears so that valve 41 opens, resulting in a renewed pressure rise.

Bistable member 39 is set, to produce a signal which enables gate 38, by a first output signal from comparator 36. Member 39 is reset, to terminate the enabling signal for gate 38, via an inverter 50 when the input signal to inlet valve 41 [creases] *ceases*.

The tendency measurement according to the invention in the second case shown in FIG. 4, which is shown by dashed lines and the stepped curve 52 representing the state of memory 31, and in which only a very slight wheel acceleration is assumed, has the result that: the pressure reduction phase will not be completed until $t'_2$; at $t'_3$ the timing member 46 is reactuated just in time, i.e. just before termination of its existing output pulse; and at $t'_4$ the outlet valve 45 is again opened since a time $\Delta$ T has passed before a subsequent pulse is generated in line 34 at time $t'_5$; and the pressure is again kept constant until $t'_7$, representing the end of the output pulse initiated in member 46 at $t'_5$. Since at $t'_7$ the slip signal has also disappeared, pressure will again begin to rise.

In the circuit thus far described, pressure reduction occurs as long as there is a slip signal and the wheel velocity is not increasing. FIG. 3 shows that in this example it is also possible, with few additional means, to sense the wheel "speed reduction tendency" and to utilize it for the regulation process. This requires only timing member 42 and line 43 as additional components to cause pressure reduction to occur only if, in addition to the slip signal, there is noted a tendency for the wheel speed to decrease at a greater than a given rate.

In order to prevent the wheel velocity from dwelling between two speed stages, when no tendency is noted, it can be determined with the aid of a further timing member 47 after a given time interval $\Delta T_1$ following the last pulse to deceleration responsive member 42, whether in the meantime a tendency has been noted for the wheel velocity to vary in one direction. $\Delta T_1$ may be identical to the pulse duration of each of members 42 and 46.

For this purpose, there is provided an OR gate 48 having inputs connected to the outputs of members 42 and 46 and an output connected to a negated input of an AND gate 49 which permits a pulse determined by the pulse duration $\Delta T_2$ of the timing member 47 to pass to the inlet valve 41 and the outlet valve 45 if at the end of time $\Delta T_1$ from the last setting of timing member 42, neither of the members 42 or 46 has been actuated, i.e., there was no change in the wheel velocity. That means that pressure is reduced for a short period of time ($\Delta T_2$).

Figure 5:
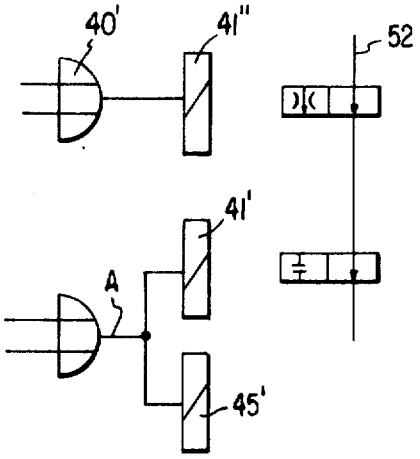
FIG. 5 is an alternative of a detail of FIG. 3.

The inlet valve of FIG. 3 can open or block the pressure line to the brakes. Instead of this one valve two inlet valves 41' and 41'' and one outlet valve 45' may be provided as shown in FIG. 5. Here pressure line 52 is blocked only when the outlet valve 45' is open by means of valve 41', while in other cases via gate 40' (corresponding to gate 40 of FIG. 3) the throttled valve 41' is controlled. Thus—instead of holding pressure constant—a slowly pressure increase is achieved.

Figure 6:
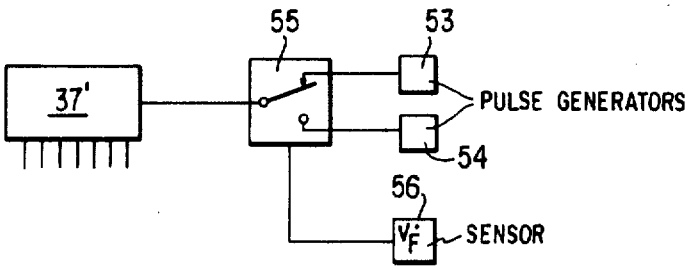
FIG. 6 is an other alternative of a detail of FIG. 3.

In FIG. 6 the possibility of changing the gradient of the reference speed signal stored in block 37 of FIG. 3 is indicated. In this case there are provided two pulse generators 53 and 54 having different pulse-frequencies. In case of low friction the pulse generator 53 with smaller pulse frequency is connected via switch 55 to the memory 37', thus only a small decrease of the reference signal is achieved. If, however, the sensor 56, which measures the vehicle deceleration, indicates a high vehicle deceleration and thus a high friction the generator 54 with the high pulse frequency is connected to the memory, which now changes the reference signal with a higher rate.

Figure 7:
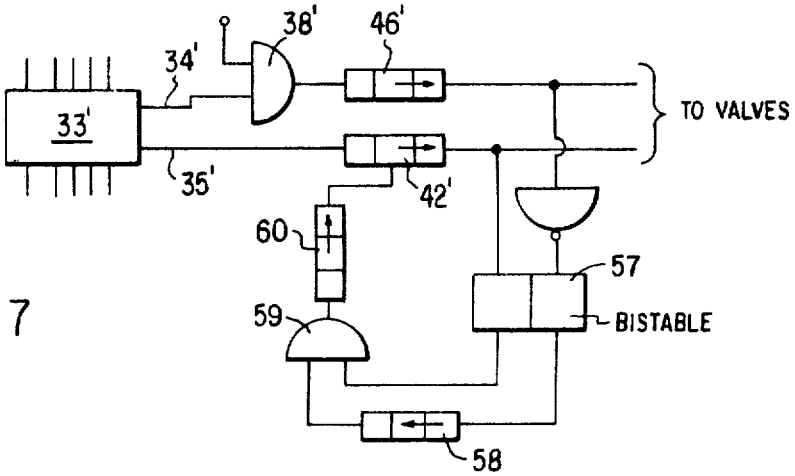
FIG. 7 is an third alternative of a detail of FIG. 3.

In FIG. 7 a block circuit is represented in detail in which the time period between the end of the tendency "speed increase" and the beginning of the tendency "speed decrease" is measured and in which an extended pressure decrease is initiated if this time period is too short. In FIG. 7 the items 33', 34', 35', 38', 42' and 46' correspond to the items 33, 34, 35, 38, 42 and 46 of FIG. 3. At the end of time constant $\Delta$ T of timing member 46' the bistable member 57 is set which then sets timing member 58, which after a given time $\Delta T_3$ produces [on] *an* output signal. This signal can pass AND-gate 59, when the bistable member 57 is reset by a signal from time member 42'. Then the output of AND-gate 59 sets timing member 60 which then for a given relatively long time increases the timing constant of timing member 42'. Thus the pressure decrease is extended.

Figure 8:
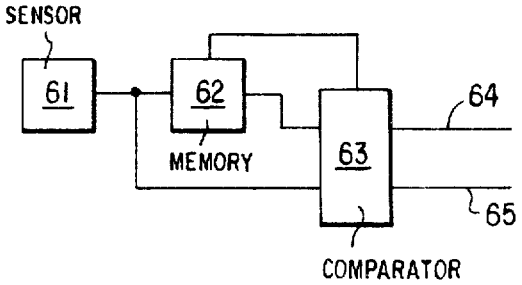
FIG. 8 is a alternative to FIG. 1 and 3 as far as the generating of tendency signals is concerned.

In FIG. 8 a further embodiment is represented in which the speed signals of two successive time instants are compared and the difference signal is used as tendency signal. The sensor 61 feeds a signal corresponding to the wheel speed to the comparator 63, which compares the instantaneous wheel speed signal with that, stored in the memory 62. After this comparison the content of the memory is discharged and the instantaneous speed signal is stored, which signal is afterwords compared with the instantaneous speed signal. If the instantaneous signal is lower than the stored one a decrease tendency signal on line 64 is generated, while in case of the stored signal being lower a increase tendency signal is generated.

It will be understood that the above description of the present invention is susceptible to various modifications, changes and adaptations, and the same are intended to be comprehended within the meaning and range of equivalents of the appended claims.

What is claimed is:

1. In an antilocking control system composed of at least one sensor connected to measure the speed of a vehicle wheel equipped with a brake and to produce a signal representative of the current wheel speed, an evaluation circuit connected to receive the signal from the sensor and generate a primary control signal, and a brake pressure control device connected to respond to the primary control signal to effect a variation in the brake pressure applied to the wheel brake in a manner to prevent the wheel from locking, the evaluation circuit acting to produce the primary control signal when the wheel speed decreases at greater than a predetermined rate, the improvement comprising signal deriving means including: wheel speed variation monitoring means connected for comparing the values, at successive instants, of a parameter dependent on wheel speed, and for producing at least one wheel speed tendency signal based on such comparison; and signal processing means connected for producing selected supplemental control signals influencing the brake pressure in a predetermined manner, in response to the appearance of such a speed tendency indication wherein said variation monitoring means are arranged to produce a wheel speed increase tendency signal in response to a parameter value comparison indicating a tendency of the wheel speed to increase, said signal processing means are arranged to produce a first supplemental control signal serving to prevent brake pressure reduction in response to the presence of the wheel speed increase tendency signal, and said signal processing means are arranged to cause the first supplemental control signal to have an influence serving to maintain the brake pressure constant.

2. An arrangement as defined in claim 1 wherein said variation monitoring means are arranged to produce a wheel speed reduction tendency signal in response to a parameter value comparison indicating a tendency of the wheel speed to decrease, and said signal processing means are arranged to produce a second supplemental control signal having a brake pressure reducing influence in response to the presence of the wheel speed reduction tendency signal.

3. An arrangement as defined in claim 2 wherein said signal processing means comprise time interval measuring means for measuring the time interval between the end of a wheel speed tendency increase signal and the beginning of a subsequent wheel speed reduction tendency signal for producing a third supplemental control signal having a brake pressure reducing influence when a selected time interval duration is not attained.

4. An arrangement as defined in claim 1 wherein said wheel speed variation monitoring means include means for storing a representation of the parameter value occuring at one instant and means for comparing the stored value with the parameter value occurring at a subsequent instant.

5. An arrangement as defined in claim 4 wherein the parameter represents the difference between the value of the signal produced by said sensor and the simultaneously existing value of a reference wheel speed signal which varies in response to variations in the wheel speed signal produced by said sensor but which can vary only at a low maximum rate during variations in the signal produced by said sensor in response to a wheel speed decrease.

6. An arrangement as defined in claim 5 wherein said wheel speed variation monitoring means produce a wheel speed tendency signal only if the parameter values at successive instants differ from one another by more than a predetermined amount.

7. An arrangement as defined in claim 4 wherein the parameter corresponds to the signal produced by said sensor.

8. An arrangement as defined in claim 1 wherein said evaluation circuit produces the primary control signal in response to occurrence of a predetermined difference between the value of the signal produced by said sensor and the simultaneously existing value of a reference wheel speed signal which varies in response to variations in the wheel speed signal produced by said sensor but which can vary at only a low maximum rate during variations in the signal produced by said sensor in response to a wheel speed decrease, and said evaluation circuit is arranged to vary the maximum rate value in dependence on the prevailing coefficient of friction between the wheel and the associated road surface.

9. In an antilocking control system composed of at least one sensor connected to measure the speed of a vehicle wheel equipped with a brake and to produce a signal representative of the current wheel speed, [and] *an* evaluation circuit connected to receive the signal from the sensor and generate a primary control signal, and a brake pressure control device connected to respond to the primary control signal to effect a variation in the brake pressure applied to the wheel brake in a manner to prevent the wheel from locking, the evaluating circuit acting to produce the primary control signal when the wheel speed decreases at greater than a predetermined rate, the improvement comprising signal deriving means including: wheel speed variation monitoring means connected for comparing the values, at successive instants, of a parameter dependent on wheel speed, and for producing at least one wheel speed tendency signal based on such comparison; and signal processing means connected for producing selected supplemental control signals influencing the brake pressure in a predetermined manner, in response to the appearance of such a speed tendency indication wherein said variation monitoring means are arranged to produce a wheel speed increase tendency signal in response to a parameter value comparison indicating a tendency of the wheel speed to increase, said signal processing means are arranged to produce a first supplemental control signal serving to prevent brake pressure reduction in response to the presence of the wheel speed increase tendency signal, and said signal processing means are arranged to cause the first supplemental control signal to have an influence serving to slowly increase the brake pressure.

10. An arrangement as defined in claim 9 wherein said variation monitoring means are arranged to produce a wheel speed reduction tendency signal in response to a parameter value comparison indicating a tendency of the wheel speed to decrease, and said signal processing means are arranged to produce a second supplemental control signal having a brake pressure reducing influence in response to the presence of the wheel speed reduction tendency signal.

11. An arrangement as defined in claim 10 wherein said signal processing means comprise time interval measuring means for measuring the time interval between the end of a wheel speed tendency increase signal and the beginning of a subsequent wheel speed reduction tendency signal for producing a third supplemental control signal having a brake pressure reducing influence when a selected time interval duration is not attained.

12. An arrangement as defined in claim 9 wherein said wheel speed variation monitoring means include means for storing a representation of the parameter value occurring at one instant and means for comparing the stored value with the parameter value occurring at a subsequent instant.

13. An arrangement as defined in claim 12 wherein the parameter represents the difference between the value of the signal produced by said sensor and the simultaneously existing value of a reference wheel speed signal which varies in response to variations in the wheel speed signal produced by said sensor but which can vary only at a low maximum rate during variations in the signal produced by said sensor in response to a wheel speed decrease.

14. An arrangement as defined in claim 13 wherein said wheel speed variation monitoring means produce a wheel speed tendency signal only if the parameter values at successive instants differ from one another by more than a predetermined amount.

15. An arrangement as defined in claim 12 wherein the parameter corresponds to the signal produced by said sensor.

16. An arrangement as defined in claim 9 wherein said evaluation circuit produces the primary control signal in response to occurrence of a predetermined difference between the value of the signal produced by said sensor and the simultaneously existing value of a reference wheel speed signal which varies in response to variations in the wheel speed signal produced by said sensor but which can vary at only a low maximum rate during variations in the signal produced by said sensor in response to a wheel speed decrease, and said evaluation circuit is arranged to vary the maximum rate value in dependence on the prevailing coefficient of friction between the wheel and the associated road surface.

17. In an antilocking control system composed of at least one sensor connected to measure the speed of a vehicle wheel equipped with a brake and to produce a signal representative of the current wheel speed, [and] *an* evaluation circuit connected to receive the signal from the sensor and generate a primary control signal, and a brake pressure control device connected to respond to the primary control signal to effect a variation in the brake pressure applied to the wheel brake in a manner to prevent the wheel from locking, the evaluation circuit acting to produce the primary control signal when the wheel speed decreases at greater than a predetermined rate, the improvement comprising signal deriving means including: wheel speed variation monitoring means connected for comparing the values, at successive instants, of a parameter dependent on wheel speed, and for producing at least one wheel speed tendency signal based on such comparison; and signal processing means connected for producing selected supplemental control signals influencing the brake pressure in a predetermined manner, in response to the appearance of such a speed tendency indication, and wherein said evaluation circuit includes comparator means connected to receive as input signals, the signal produced by said sensor and a reference wheel speed signal which varies in response to variations in the signal produced by said sensor but which can vary only at a low maximum rate during variations in the signal produced by said sensor in response to a wheel speed decrease, and to produce a comparator output signal proportional to the difference between the input signals and constituting the primary control signal when the wheel speed represented by the signal produced by said sensor is less than the wheel speed represented by the reference signal by a predetermined amount, and wherein the comparator output signal is supplied to said wheel speed variation monitoring means to constitute the parameter dependent on wheel speed.

18. In an antilocking control system composed of at least one sensor connected to measure the speed of a vehicle wheel equipped with a brake and to produce a signal representative of the current wheel speed, an evaluation circuit connected to receive the signal from the sensor and generate a primary control signal, and a brake pressure control device connected to respond to the primary control signal to effect a variation in the brake pressure applied to the wheel brake in a manner to prevent the wheel from locking, the evaluation circuit acting to produce the primary control signal when the wheel speed decreases at greater than a predetermied rate, the improvement comprising signal deriving means including: wheel speed variation monitoring means connecting for comparing the values, at successive instants, of a parameter dependent on wheel speed, and for producing at least one wheel speed tendency signal based on such comparison; and signal processing means connected for producing selected supplemental control signals influencing the brake pressure in a predetermined manner, in response to the appearance of such a speed tendency indication and wherein the parameter corresponds to the signal produced by said sensor, said wheel speed variation monitoring means comprise: readout means providing a representation of the instantaneous value of the output signal from said sensor; signal representation storage means; comparator means connected to compare the representations provided by said readout means and said signal representation storage means, to generate a correction signal each time the representations being compared differ by more than a predetermined amount, and to apply such correction signal to said signal representation storage means to vary the representation in said storage means by a selected amount in a direction to reduce the difference between the compared values, and said signal processing means comprise switching means connecting for producing such supplemental control signals in response to such correction signals.

19. An arrangement as defined in claim 18, wherein said readout means, said storage means and said comparator means are each constituted by a digital circuit.

20. An arrangement as defined in claim 18 wherein said switching means comprise a timing member connected to produce a signal having a predetermined duration and constituting supplemental control signals in response to each such correction signal.

21. An arrangement as defined in claim 20, wherein said readout means, said storage means and said comparator means are each constituted by a digital circuit.

*22. In an antilocking control system composed of at least one sensor connected to measure the speed of a vehicle wheel equipped with a brake and to produce a signal representative of the current wheel speed, an evaluation circuit connected to receive the signal from the sensor and generate a primary control signal, and a brake pressure control device connected to respond to control signals to effect a variation in the brake pressure applied to the wheel brake in a manner to prevent the wheel from locking, the evaluation control acting to produce the primary control signal when the wheel slip is greater than a predetermined value, the improvement comprising signal deriving means including: wheel speed variation monitoring means connected for comparing the values, at successive instants, of a parameter dependent on wheel speed, and for producing at least one wheel speed tendency signal based on such comparison; and signal processing means connected for producing second control signals in response to the appearance of such a speed tendency signal and of said primary control signal; wherein said variation monitoring means are arranged to produce a wheel speed increase tendency signal in response to a comparison indicating a tendency of the wheel speed to increase, and said signal processing means are arranged to produce second control signals serving to reduce brake pressure in response to the presence of said primary control signal and to prevent brake pressure reduction and main-*

*tain the brake pressure constant in response to the presence of said wheel speed increase tendency signal.*

*23. In an antilocking control system composed of at least one sensor connected to measure the speed of a vehicle wheel equipped with a brake and to produce a signal representative of the current wheel speed, an evaluation circuit connected to receive the signal from the sensor and generate a primary control signal, and a brake pressure control device connected to respond to control signals to effect a variation in the brake pressure applied to the wheel brake in a manner to prevent the wheel from locking, the evaluation circuit acting to produce the primary control signal when the wheel slips at greater than a predetermined value, the improvement comprising signal deriving means including: wheel speed variation monitoring means connected for comparing the values, at successive instants, of a parameter dependent on wheel speed, and for producing at least one wheel speed tendency signal based on such comparison; and signal processing means connected for producing second control signals in response to the appearance of such a speed tendency signal and of said primary control signal; wherein said variation monitoring means are arranged to produce a wheel speed increase tendency signal in response to a comparison indicating a tendency of the wheel speed to increase and said signal processing means are arranged to produce second control signal serving to reduce brake pressure in response to the presence of said primary control signal and serving to prevent brake pressure reduction and cause the brake pressure to slowly increase in response to the presence of the wheel speed increase tendency signal.*

*24. In an antilocking control system composed of at least one sensor connected to measure the speed of a vehicle wheel equipped with a brake and to produce a signal representative of the current wheel speed, an evaluation circuit connected to receive the signal from the sensor and generate a primary control signal, and a brake pressure control device connected to respond to the primary control signal to effect a variation in the brake pressure applied to the wheel brake in a manner to prevent the wheel from locking, the evaluation circuit acting to produce the primary control signal when the wheel slip is greater than a predetermined value, the improvement comprising signal deriving means including: wheel speed variation monitoring means connected for comparing the values, at successive instants, of a parameter dependent on wheel speed, and for producing at least one wheel speed tendency signal based on such comparison; and signal processing means connected for producing a second control signal in response to the appearance of such a speed tendency signal and of said primary control signal; wherein said variation monitoring means are arranged to produce a wheel speed decrease tendency signal in response to a comparison indicating a tendency of the wheel speed to decrease, and said signal processing means are arranged to produce a second control signal serving to reduce brake pressure in response to the presence of the said wheel speed decrease tendency signal and of said primary control signal.*

*25. In an antilocking control system including at least one sensor connected to measure the speed of a vehicle wheel equipped with a brake and to produce a signal representative of the current wheel speed, a control circuit connected to receive the signal from said sensor and generate control signals based on the signal from said sensor, and a brake pressure control device responsive to said control signals to effect a variation in the brake pressure applied to the wheel brake to prevent the wheel from locking, said control circuit including first circuit means, responsive to the signal from said sensor, for generating a slip signal whenever the wheel slip reaches a predetermined value; the improvement wherein said control circuit further includes: second circuit means for comparing the values at short successive time intervals of a parameter dependent on wheel speed and for producing a first output signal whenever the comparison indicates that the wheel speed has been increased by at least a given amount, and for producing a second output signal whenever the comparison indicates that the wheel speed has decreased by at least a given amount; and logic circuit means, responsive to the output signals from said first and second circuit means, for producing a first control signal for said brake pressure control device to reduce the brake pressure whenever said first circuit means is generating a slip signal and said second circuit means is producing said first output signal, and for producing a second control signal for said brake pressure control device to prevent reduction of said brake pressure whenever said first circuit means is generating said slip signal and said second circuit means is producing said second output signal.*

*26. An arrangement as defined in claim 25 wherein said second control signal causes said brake pressure to remain constant.*

*27. An arrangement as defined in claim 25 wherein said second control signal causes said brake pressure to slowly increase.*

* * * * *